2,820,071

METHANE SEGREGATION METHOD AND PRODUCT

Norman H. Ceaglske, Minneapolis, Minn., assignor of ninety percent to Minnesota Valley Natural Gas Company, St. Peter, Minn., a corporation of Minnesota No Drawing. Application November 20, 1953
Serial No. 393,495

21 Claims. (Cl. 260—676)

This invention relates to a new method and a new product by means of which methane may be separated from gas mixtures containing methane. The method in one of its aspects is more specifically one for separating methane from a gas mixture containing other hydrocarbons and it is especially of value in connection with gas mixtures which occur naturally, such as natural gas.

The method may either be used to isolate methane or, alternatively, may be used to enrich a gas mixture, such as natural gas, in hydrocarbons other than methane, for instance, in ethane so as to simplify and to increase the efficiency of a process of isolating the latter. Further, in one of its aspects, the method may not only be used for separating methane but also for storing the same for future use. As methane is a practically valuable component the storage of the methane content of the natural gas is of value under certain circumstances.

The invention is based on a phenomenon which has been discovered by the applicant and which, to the best of his knowledge was not known before. It consists in the property of methane of forming complexes or complex compounds of a special character with hydroquinone.

Complex compounds of a type which may be said to be similar in some respects to those obtained in this application have been known for a number of years in connection with other organic compounds. Most of these complex compounds, sometimes termed "addition compounds," "adducts," "inclusion compounds" or the like were obtained in connection with certain crystallized organic compounds, such as urea and thiourea (U. S. Patents No. 2,642,421, No. 2,627,513, No. 1,933,757, No. 2,300,-134, No. 1,980,901 and others).

These compounds, in some respects, are unlike chemical compounds in the strict sense of the term, as they seem to be held together by forces other than those binding the molecules, for instance, by hydrogen bonding or Vander Waals forces. Various theories have been suggested with respect to the binding forces between atoms and molecules in such clathrate complexes, connecting the binding forces with the crystal lattice. These theories however will not be discussed here as the nature of the forces involved is not material.

It was found—a fact which is independent of any theory—that hydroquinone is capable of forming a complex compound or "inclusion compound" with methane, binding the methane selectively under the conditions stated below, and it was further found, that by dissolving the complex compound so formed in a sufficient quantity of solvent, the methane is again completely released.

The method according to the invention therefore consists, on principle, in forming the above mentioned complexes or "inclusion compounds" by bringing the methane into contact with crystals of hydroquinone which have been wetted with a suitable amount of the hydroquinone solvent. As will be seen from the examples stated below, alcohols and ethers are suitable solvents. The nature of the solvent used does not seen to have an influence on the resulting complex compound.

The action is selective insofar as only methane forms compounds of the above described nature while all higher hydrocarbons do not enter into similar complexes or "inclusion compounds." The formation of the inclusion compounds takes place at ordinary room temperature, but it is accelerated when the temperature is raised.

The complex or "inclusion compound" thus formed is stable at ordinary temperatures such as usually encountered, over a period of at least many months. The limit of the period of stability has not as yet been determined.

The release of the methane from a complex compound is produced by dissolving the compound in a sufficient quantity of a hydroquinone solvent at ordinary temperatures, a process which may be carried out at a higher temperature with a smaller quantity of a solvent, if the solvent selected is less volatile.

To apply the method according to the invention hydroquinone is first wetted with a quantity (varying usually between 7% and a saturated solution) of a suitable liquid, preferably a hydroquinone solvent. As far as known any hydroquinone solvent may be used, including water. A layer or layers of hydroquinone are formed through which the methane containing gas mixture, for instance, a mixture of methane, ethane, propane and other gases, or natural gas is passed. The depth of the layer or layers of wet hydroquinone which have been formed depends on the percentage of the methane which it is intended to bind. The binding or "reaction" takes place at room temperature but it is accelerated if the temperature is raised to 75° C. Likewise the pressure applied may be any pressure which drives the gas through the hydroquinone layer or layers, but the process is considerably accelerated if the pressure is increased.

To bind as much methane as possible some time is necessary varying with the depth of the layer, the volume and pressure of the gas passed through per time unit, and the temperature. If the hydroquinone layer is left standing under the pressure of the gas mixture after admission of the latter, the pressure drops and must be restored by admitting fresh gas. This is due to the reaction of the methane with the hydroquinone and to the formation of a complex compound. The pressure drops, because the partial pressure due to the presence of methane in the mixture is reduced. The pressure reduction may be taken as a yardstick for the speed of the reaction and the admission of gas under pressure may be regulated accordingly.

With deep layers of hydroquinone the maximum amount of methane which may be bound was found so far to be 0.67 cu. ft./lb. solid material. The complex compound which was formed is essentially solid. It has very much the consistency of wet ice or salt. It is completely stable and can be stored during protracted periods. Storage during 3 to 4 months did not result in any loss of methane an indication that indeed a stable compound of some kind was found.

The process may be carried out in batches in a vertical cylindrical column within which the hydroquinone is stored. The column may, for instance, be similar to that described in my copending application Serial No. 393,340, filed November 20, 1953.

Such a column may be filled to a sufficient depth with the wetted hydroquinone. However, in order to avoid tight packing on the bottom of the column, the column may be provided with a number of wire mesh supports or with other porous supports one above the other, which offer passage for a gas but which retain the hydroquinone. A plurality of superposed layers is thus formed permitting the passage of a gas through a sufficient total depth or layers of excessive depth. The column is connected with a gas supply pipe at its bottom and a gas discharge pipe at its top, and the gas mixture passes through it under the pressure which has been selected.

To release the methane the compound is dissolved in a sufficient quantity of a hydroquinone solvent. As far as known all hydroquinone solvents may be used.

Hydroquinone solvents are in the first place water, and those alcohols and ethers which are liquids. The solubility of hydroquinone in different alcohols varies.

Actually tested in connection with the above described process, and found to be good solvents for hydroquinone and the complex compound, and suitable for wetting hydroquinone were the aliphatic saturated monohydroxy alcohols (alkanols): methyl, ethyl, n-butyl, n-propyl, isopropyl, tert-butyl, n-amyl alcohol. Many aliphatic saturated polyhydric alcohols are known to be hydroquinone solvents. This is also known of some alkenols (unsaturated monohydroxy alcohols) and of some aromatic and cyclic alcohols.

Likewise, ethers, as far as fluid, are hydroquinone solvents. Actually tested were among the simple and mixed alkyl ethers: ethyl; isopropyl; butyl; amyl ether; among the mixed unsaturated ethers: vinyl ethyl ether and vinyl butyl ether; among the ethers of ethylene glycol: methyl cellosolve (ethylene glycol methyl ether); among the aromatic ethers, benzyl ether. All these solvents were found to release methane according to the degree of solubility of hydroquinone in them, or differently stated, the complex clathrate compound was soluble to the same degree in which hydroquinone was soluble.

Preferably a solvent having a boiling point substantially above 100° C. is used and the dissolving is carried out at about this temperature. In this case the quantity of the solvent necessary for the operation is smallest.

The formation of the complex compound and the release of the methane may also be obtained in another way by a change in temperature and by using the different solubility of hydroquinone in a solvent at different temperatures. A cylindrical vessel, such as above described, provided with regulable heating means on the outside or inserted into a chamber which may be heated by suitable regulable heating means, is preferably used. This cylindrical vessel is provided with pipe connections which may be opened and closed and which leads to the pipe system supplying the gas mixture on one side, and to a reception receptacle for the methane-free gas mixture and for methane on the other side. The two receptacles may be connected alternatively with the cylindrical vessel.

The cylindrical vessel is then filled with a solution of hydroquinone in a solvent at a high temperature at which it will hold a large quantity of hydroquinone in solution. A solution of hydroquinone in n-butyl alcohol may be used, for example.

If the vessel is now cooled the hydroquinone crystallizes and forms a layer accumulating at the bottom of the vessel or on the screens held in the vessel filled with the solution.

Now the gas mixture is admitted and is passed through the layer or layers of hydroquinone and through the solution above it, whereby the methane is bound and forms the complex or inclusion compound in the wet hydroquinone. After cutting off the gas mixture and connecting the delivery pipe of the vessel with the methane receiving gas receptacle the cylindrical vessel is again heated on the outside to the temperature at which the hydroquinone goes into solution. The methane is released during the solution process and is conducted to the receiving receptacle. The process can now be repeated after changing again the connection of the pipes.

The methane in this case can be currently removed without removal of the inclusion compound from the vessel.

*Example 1*

A mixture of 37 gm. of hydroquinone and 60 cc. of diethyl ether were placed in a cylinder with a total volume of 175 cc. The cylinder was placed in a bath maintained at between 45 and 55° C. Natural gas was passed through the cylinder at a pressure varying between 1400 and 1600 lb./sq. in. The volume of gas passed through the layer of hydroquinone in the cylinder was 2 cu. ft. It took approximately 1 hour to bubble this gas through the layer. The excess gas was released and the solid was removed. The quantity of methane in the solid was determined by dissolving the weighed quantity of solid in ethyl alcohol and the gas which was given off was measured. The volume of methane released was in this case 0.42 cu. ft./lb. of solid.

*Example 2*

45 gm. of hydroquinone and 45 cc. of ethyl ether were placed in a cylindrical vessel. The bath was maintained at −6° C. and the pressure in this case was 550 lb./sq. in. Over a period of exactly one-half hour 2 cu. ft. of natural gas were passed through the cylinder. After releasing the excess gas the solid was again tested for methane in the manner described in Example 1. It was found that 0.61 cu. ft. were contained in every lb. of solids.

*Example 3*

110 gms. of hydroquinone were wetted with 45 cc. of n-butyl alcohol and placed in a cylinder. The bath in this case was maintained at 30° C., the pressure was approximately 550 lb./sq. in. over a period of 40 minutes 1 cu. ft. of natural gas was passed through the cylinder. Upon standing for 1 hour and 40 minutes the pressure dropped requiring the addition of gas to maintain the desired pressure. After releasing the excess gas the solid was again tested in the manner indicated in Example 1 and was found to contain 0.67 cu. ft. of methane per lb. of solid.

*Example 4*

A mixture of hydroquinone and n-butyl alcohol weighing 110 gms. containing 7.89% of alcohol (percentage on dry basis) was placed in the cylinder. The bath was maintained at approximately 60° C. said bath surrounding, as in Example 1, a cylinder of a total volume of 175 cc. Natural gas was added to bring the pressure up to 330 lb./sq. in.; in 30 minutes the pressure dropped to 122 lb./sq. in. indicating that the reaction of methane with the hydroquinone was rapid at this temperature. After releasing the excess gas the amount of methane which had been fixed in the inclusion compound was determined in the manner above indicated. The solid contained approximately 0.4 cu. ft. of methane for each lb. of the solid.

*Example 5*

1¼ lbs. of hydroquinone and 140 cc. of n-butyl alcohol (approximately 20% of alcohol by weight on a dry basis) were placed in a large cylinder the total volume of which was approximately 1100 cc. The cylinder was maintained at a temperature of 50–60° C. Natural gas was added until the pressure was 120 lb./sq. in. Since the pressure drops when the reaction takes place gas was added twice to bring the pressure back to 120 lb./sq. in. After standing overnight the pressure was 45 lb./sq. in.

Specific gravity of the free gas in the cylinder was now determined and it was found that the specific gravity was between 0.93–0.95. This indicated that practically all of the methane had reacted with the hydroquinone. This example therefore illustrates a batch type method for removing methane from a mixture of gases such as natural gas.

*Example 6*

A mixture of 35 gms. of hydroquinone and 60 cc. of ethyl alcohol were used again in a small cylinder as described in Example 1. The pressure in this case was kept at 1500 lb./sq. in. and the volume of gas passed through was again 2 cu. ft. over a period of 1 hour. The temperature at which the bath surrounding the cylinder was kept was 45° C. The result was very nearly the same as that obtained in Example 1 showing that the nature of the wetting substance and of the solvent has little influence.

Example 7

The same mixture as stated in Example 1 under same conditions was wetted with a mixture of methyl alcohol and n-butyl alcohol. The results were again approximately those described in Example 1.

From the above examples it will be seen that the process may be carried out in batches using cylindrical containers either arranged in the vertical or in a horizontal position and which are filled to a predetermined extent with a wetted hydroquinone. The gas mixture from which the methane has to be separated is then conducted through the container and through the layer of hydroquinone of predetermined depth allowing the gas mixture to remain in contact with the hydroquinone for a sufficient time. The gas mixture is preferably under pressure which pressure may be selected between atmospheric pressure and 1500 lb./sq. in. As the pressure drops during the reaction by virtue of the inclusion or absorption of the methane when the inclusion compound is formed, gas must be supplied either continuously or from time to time to maintain the pressure at the desired value. The temperature of the container is maintained by suitable automatic heating means at a predetermined level which is preferably between 45° and 75° C. After the predetermined time necessary to remove all the methane from the mixture the complex compound which has been formed is removed and the remaining gas may also be removed while a fresh batch of hydroquinone is introduced.

Obviously the method may also be converted into a continuous process using known principles.

The inclusion compound may now be stored and may be used thereafter for releasing the methane.

Such release is also effected in suitable containers into which the product is filled and into which the solvent for the hydroquinone, such as one of the lower alcohols is introduced. This latter process is more completely described in my co-pending application Serial No. 393.340.

The method is usable to enrich gas mixtures (containing methane and other hydrocarbons or other gases) in non-methane compounds by removing the methane, according to the method above described and treating the enriched mixture in any desired manner.

This is of particular practical importance in connection with natural gas, the main constituents of which are methane and ethane. As ethane is a valuable gas it is frequently desired to produce a mixture consisting mainly of or considerably enriched in ethane.

An average composition of natural gas used in these experiments is:

| | Percent |
|---|---|
| Methane | 75 |
| Ethane | 13 |
| Nitrogen | 12 | with additions of other constituents mostly hydrocarbons which are only below 1% and which need not be considered.

Even with a removal of only 50%–55% of the methane by the method above outlined the composition of the gas will be

| | Percent |
|---|---|
| Methane | 59.7 |
| Ethane | 20.9 |
| Nitrogen | 19.4 |

This mixture is already much more suitable for further processing and for extracting ethane than the original mixture. The composition however, may be further improved and made more suitable for ethane extraction, by removing as high a percentage of methane as the apparatus used will economically permit.

The method above described may therefore be used as a preliminary step to treating natural gas which is further processed to extract or utilize the ethane content.

It will thus be seen that a new type of process has been described which permits the selective segregation of methane by novel means from a gas mixture by virtue of the fact that the hydroquinone does not form a complex or inclusion compound with any other hydrocarbon, the reaction in this case being specific. The method is simple and effective, can be combined with other methods and is highly efficient, insofar as there is practically no loss of material connected with it.

It will be clear that unessential changes may be made without in any way departing from the essence of the invention as defined in the annexed claims.

What is claimed as new is as follows:

1. The method of segregating methane from a gas mixture which consists in contacting a gas mixture containing methane with wetted hydroquinone.

2. The method of segregating methane from a gas mixture which consists in passing a gas mixture containing methane under a pressure higher than the atmospheric pressure through wetted crystalline hydroquinone.

3. The method of segregating methane from a gas mixture which consists in contacting a gas mixture containing methane under pressure with hydroquinone crystals wetted with a hydroquinone solvent.

4. The method as claimed in claim 3, wherein the hydroquinone solvent is an alcohol.

5. The method as claimed in claim 3, wherein the hydroquinone solvent is an ether.

6. The method as claimed in claim 3, wherein the hydroquinone solvent is an aliphatic saturated monohydroxy alcohol.

7. The method as claimed in claim 3, wherein the hydroquinone solvent is a simple saturated alkyl ether selected from the group: ethyl ether, butyl ether, amyl ether.

8. The method as claimed in claim 3, wherein the hydroquinone solvent is a mixed alkyl ether selected from the group of vinyl ethyl ethers and vinyl butyl ethers.

9. The method as claimed in claim 3, wherein the hydroquinone solvent is an ethylene glycol ether.

10. The method as claimed in claim 9, wherein the hydroquinone solvent is methyl cellosolve.

11. The method as claimed in claim 3, wherein the hydroquinone solvent is an aromatic ether selected from the group of phenyl ethers.

12. The composition of matter which comprises crystalline hydroquinone and methane.

13. The composition of matter which comprises methane bound to crystalline hydroquinone wetted with hydroquinone solvent.

14. The method of segregating methane from a gas mixture which comprises contacting the gas mixture with wetted crystalline hydroquinone, thus forming a crystalline methane containing compound and in dissolving said compound in a hydroquinone solvent, thus releasing the methane from the compound.

15. The method of storing methane segregated from a gas mixture containing methane, which comprises contacting said gas mixture with wetted crystalline hydroquinone, thus forming a crystalline methane containing compound, and in storing the said compound.

16. The method of storing and releasing methane which consists in contacting methane with hydroquinone wetted with a hydroquinone solvent, in storing the compound formed by the contact of methane with crystalline hydroquinone and in treating said stored compound with a hydroquinone solvent thereafter, thus releasing the methane and collecting the released methane.

17. The method of segregating methane from a gas mixture and for storing it which consists in forming a deep layer of crystalline hydroquinone wetted with a hydroquinone solvent, in passing the gas mixture under a pressure above the atmospheric pressure through the said layer, thus producing a crystalline compound containing methane and hydroquinone and in removing and storing the crystalline compound.

18. The method of segregating methane from a gas mixture which consists in heating a solution of hydroquinone in a solvent to a temperature at which all the hydroquinone is in solution, in cooling the hot solution to a temperature at which the hydroquinone crystallizes, in conducting the methane containing gas mixture through the crystallized hydroquinone and the solution from which it crystallized, and in raising again the temperature of the solution to the original value, at which the crystallized hydroquinone is dissolved, thus releasing the methane from the compound formed during the passage of the gas mixture.

19. The method of enriching a gas mixture containing methane and compounds other than methane which consists in removing the methane from the mixture by contacting the gas mixture with crystalline hydroquinone wetted with a hydroquinone solvent, thus forming a compound retaining the methane in a solid crystalline shape and increasing the percentage of non-ethane gases within the mixture.

20. In the method of producing ethane from natural gas a preliminary step which consists in contacting the natural gas under a pressure higher than the atmospheric pressure with crystalline hydroquinone wetted with a hydroquinone solvent.

21. The method as claimed in claim 3, wherein the hydroquinone solvent is n-butyl alcohol.

References Cited in the file of this patent
UNITED STATES PATENTS

| | | |
|---|---|---|
| 1,951,205 | Rather et al. | Mar. 13, 1934 |
| 2,630,403 | Miller | Mar. 3, 1953 |
| 2,632,726 | Ringham et al. | Mar. 24, 1953 |
| 2,635,986 | Hess et al. | Apr. 21, 1953 |
| 2,640,051 | Lynch | May 26, 1953 |
| 2,661,812 | Gilmore | Dec. 8, 1953 |

OTHER REFERENCES

Powell: Jour. Chem. Soc. (London), 1948, pages 61–73.

Kobe et al.: Petroleum Refiner (part I), vol. 31, No. 3, March 1952, pages 106–113.

Truter: Research (London), vol. 6, pages 320–326 (1953). (Abstracted in Chem. Abstracts, vol. 47 (1953), page 11828g.)